United States Patent
Revanuru et al.

(10) Patent No.: US 7,752,629 B2
(45) Date of Patent: Jul. 6, 2010

(54) SYSTEM AND METHOD FOR APPLICATION SERVER WITH OVERLOAD PROTECTION

(75) Inventors: Naresh Revanuru, Fremont, CA (US); Anno R. Langen, Berkeley, CA (US)

(73) Assignee: BEA Systems Inc., Redwood Shores, CA (US)

( * ) Notice: Subject to any disclaimer, the term of this patent is extended or adjusted under 35 U.S.C. 154(b) by 1401 days.

(21) Appl. No.: 11/132,782

(22) Filed: May 19, 2005

(65) Prior Publication Data

US 2005/0273456 A1 Dec. 8, 2005

Related U.S. Application Data

(60) Provisional application No. 60/573,307, filed on May 21, 2004.

(51) Int. Cl.
*G06F 9/50* (2006.01)
*G06F 9/46* (2006.01)
*G06F 17/00* (2006.01)

(52) U.S. Cl. .................... 718/105; 718/100; 718/103; 709/201; 709/203

(58) Field of Classification Search ............. 718/100, 718/103, 105; 709/201, 203
See application file for complete search history.

(56) References Cited

U.S. PATENT DOCUMENTS

| | | | |
|---|---|---|---|
| 6,502,104 B2 | 12/2002 | Fung et al. | |
| 6,539,383 B2 | 3/2003 | Charlet et al. | |
| 6,594,671 B1 | 7/2003 | Aman et al. | |
| 7,340,742 B2 | 3/2008 | Tabuchi | |
| 2002/0133504 A1 | 9/2002 | Vlahos et al. | |
| 2002/0143721 A1 | 10/2002 | Charlet et al. | |
| 2002/0143722 A1 | 10/2002 | Lee et al. | |
| 2002/0194251 A1 | 12/2002 | Richter et al. | |
| 2003/0028583 A1 | 2/2003 | Flores et al. | |
| 2003/0039258 A1 | 2/2003 | Tuck et al. | |
| 2003/0236815 A1* | 12/2003 | Brenner et al. | 709/104 |
| 2005/0198285 A1* | 9/2005 | Petit | 709/225 |

FOREIGN PATENT DOCUMENTS

WO   WO 03003753   1/2003

OTHER PUBLICATIONS

Stathopoulos, et al., "ICALB: An Integrated Congestion Avoidance and Load Balancing Algorithm for Distributed Intelligent Networks. Part 1: Description of ICALB", Computer Communications, Nov. 1, 2002, pp. 1548-1563, vol. 25, No. 17, Elsevier Science Publishers BV, Amsterdam, NL.

(Continued)

*Primary Examiner*—Li B Zhen
(74) *Attorney, Agent, or Firm*—Fliesler Meyer LLP

(57) ABSTRACT

A system and method for application server with overload protection. A system, for example a server or a cluster, is designed to generate a message, and/or reject further work, whenever the server becomes overloaded. It does this in a processor-efficient manner so as not to place even more strain on the already burdened server. The rejection message or action is customizable. In accordance with an embodiment, the system determines where the request would appear in a priority queue, and rejects those further down the queue. It does this quickly and with minimal processing time by determining to which workload manager the request is going to be delivered.

21 Claims, 1 Drawing Sheet

OTHER PUBLICATIONS

Stathopoulos, et al., "ICALB: An Integrated Congestion Avoidance and Load Balancing Algorithm for Distributed Intelligent Networks. Part 2: Description of ICALB", Computer Communications, Nov. 1, 2002, pp. 1564-1574, vol. 25, No. 17, Elsevier Science Publishers BV, Amsterdam, NL.

Montez, et al., "Implementing Quality of Service in Web Servers", Proceedings of the Symposium on Reliable Distributed Systems, Oct. 13, 2002, pp. 32-40, IEEE Computer Society, Los Alamitos, CA, USA.

European Search Report for EP 05751891.2, dated Jan. 27, 2009, 5 pages.

Etienne et al., "A Java Platform to Control Real-Time Transactions Overload," 7th IEEE International Symposium on Object-Oriented Real-Time Distributed Computing, May 14, 2004, pp. 219-226.

Notification of Transmittal of the International Search Report and the Written Opinion of the International Searching Authority, or the Declaration, Dated Oct. 20, 2006, in re PCT Application No. PCT/US05/17861.

* cited by examiner

SYSTEM AND METHOD FOR APPLICATION SERVER WITH OVERLOAD PROTECTION

CLAIM OF PRIORITY

This application claims priority from provisional application entitled SYSTEM AND METHOD FOR APPLICATION SERVER WITH OVERLOAD PROTECTION, Application No. 60/573,307, filed May 21, 2004, by Naresh Revanuru and Anno Langen, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to application servers and messaging systems, and specifically to a system and method for application server with overload protection.

BACKGROUND

In a typical application server or web server environment, a server may be receiving thousands of requests within a very short time-frame. In certain instances the server would become overloaded and be unable to process further requests. To the user this appears as a page error, or a frozen page. The user will typically keep hitting the server with requests, when this really doesn't have any effect and only serves to worsen the problem. What is needed is a mechanism that can notify the user that the server is currently overloaded, and which will allow the server to regain stability while not having to deal with further requests. The traditional approach has been to generate a server "object not found", or to place the requests in a fixed-length queue. However, no attempt is made to characterize the requests or to, for example, reject those requests that will take longer than one minute, while servicing the others.

SUMMARY

In accordance with an embodiment of the invention, a system, for example, a server or a cluster, is designed to generate a message, and/or reject further work, whenever the server becomes overloaded. It does this in a processor-efficient manner so as not to place even more strain on the already burdened server. The rejection message or action is customizable. However, there is a thin line between customizing to the point of being flexible, and overly customizing to the point of adding more processor requirements. Above all, the rejection must be handled quickly. The traditional approach fails to adapt for certain requests, such as for example ensuring payment requests are communicated at the expense of simple browsing requests. A company might address this by installing multiple servers. However, the invention allows for optimal processing even within a single server.

In accordance with an embodiment, the system determines where the request would appear in a priority queue, and rejects those further down the queue. It does this quickly with minimal processing time by determining which workload manager the request, (for example an http request), is going to be delivered to. The http request is parsed by a queuing logic, and the destination servlet determined. An administrator can configure which servlets should be prioritized above others. The parsing thus implies a particular workload manager associated with that servlet, and the corresponding priority for the request. The request is not looked at too rigorously, but primarily only at the URL level to determine which workload manager or servlet will handle the request. The system can also be used to provide feedback to the user or an administrator that certain requests will not be handled at the current time, but for example that other requests could be handled. This message may also be customized within reasonable limits which is not possible with existing methodologies.

In accordance with an embodiment the system is configured to specify a threshold for an individual workload manager, together with a global overload threshold. Requests are given virtual time stamps and queued accordingly, according to priority. When the threshold is exceeded, requests below the threshold priority are rejected.

DETAILED DESCRIPTION

Figure 1:
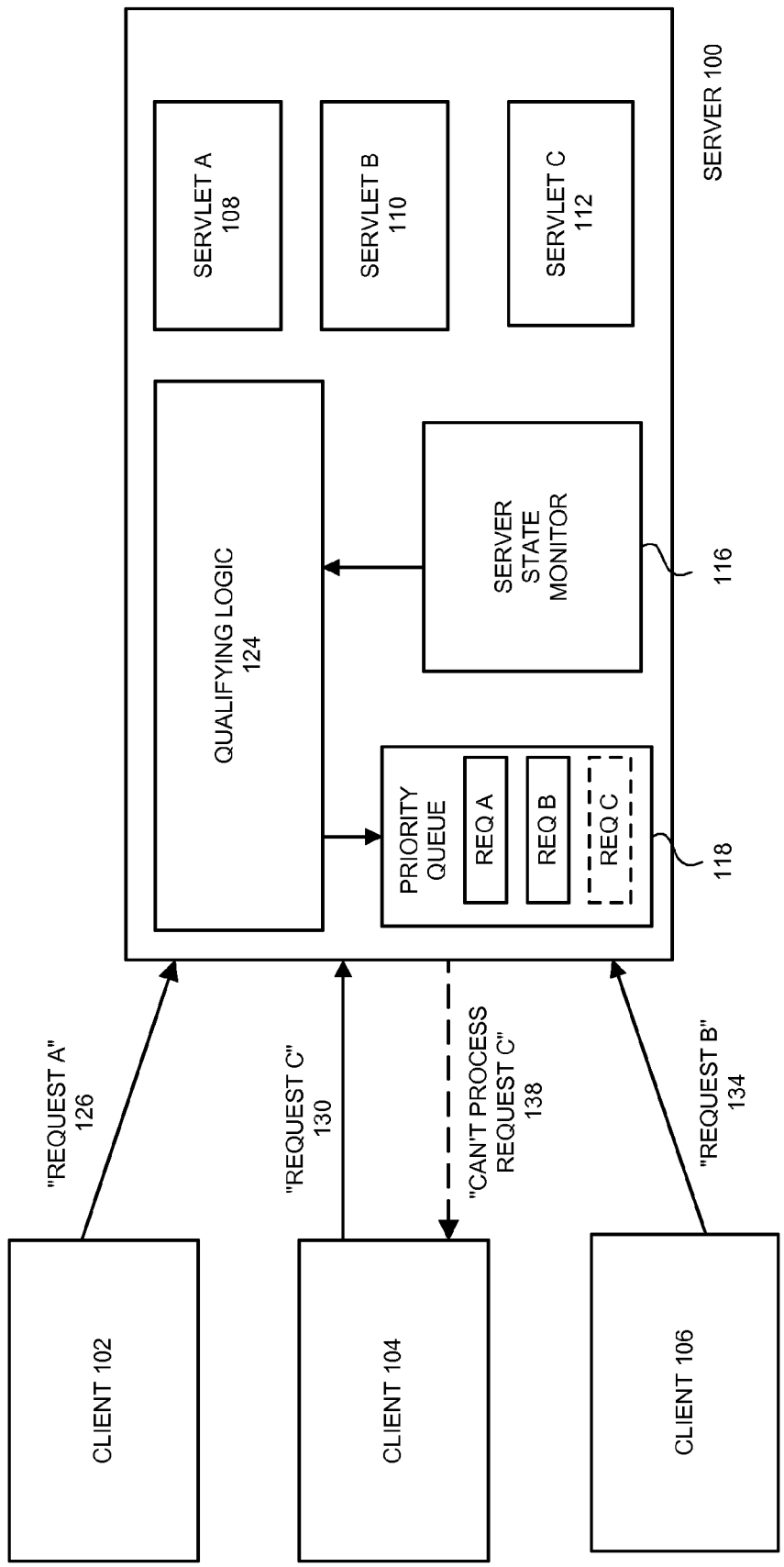
FIG. 1 shows an illustration of an environment including a system which uses server over load protection in accordance with an embodiment of the invention.

Overload protection plays an important part in the overall availability of a server or a cluster. In a typical application server or web server environment, a server may be receiving thousands of requests within a very short time-frame. In certain instances the server would become overloaded and be unable to process further requests. To the user this appears as a page error, or a frozen page. The user will typically keep hitting the server with requests, when this really doesn't have any effect and only serves to worsen the problem. The traditional approach has been to generate a server "object not found", or to place the requests in a fixed-length queue. However, no attempt is made to characterize the requests or to, for example, reject those requests that will take longer than one minute, while servicing the others. Other implementations are unaware of overload conditions and continue to accept requests. Accepting requests will aggravate the situation resulting in poor performance and stability. What is desired is fast fail of requests in such conditions. This works well in a cluster as the load is distributed amongst the remaining members of the cluster.

In accordance with an embodiment of the invention, a system, for example a server or a cluster, is designed to generate a message, and/or reject further work, whenever the server becomes overloaded. It does this in a processor-efficient manner so as not to place even more strain on the already burdened server. The rejection message or action is customizable. However, there is a thin line between customizing to the point of being flexible, and overly customizing to the point of adding more processor requirements. Above all, the rejection must be handled quickly. The traditional approach fails to adapt for certain requests, such as for example ensuring payment requests are communicated at the expense of simple browsing requests. A company might address this by installing multiple servers. However, the invention allows for optimal processing even within a single server.

In accordance with an embodiment, the system determines where the request would appear in a priority queue, and rejects those further down the queue. It does this quickly with minimal processing time by determining which workload manager the request, (for example an http request), is going to be delivered to. The http request is parsed by a queuing logic, and the destination servlet determined. An administrator can configure which servlets should be prioritized above others. The parsing thus implies a particular workload manager associated with that servlet, and the corresponding priority for the request. The request is not looked at too rigorously, but primarily only at the URL level to determine which workload manager or servlet will handle the request. The system can also be used to provide feedback to the user or an administrator that certain requests will not be handled at the current time, but for example that other requests could be handled. This message may also be customized within reasonable limits which is not possible with existing methodologies.

In accordance with an embodiment the system is configured to specify a threshold for an individual workload manager, together with a global overload threshold. Requests are given virtual time stamps and queued accordingly, according to priority. When the threshold is exceeded, requests below the threshold priority are rejected.

FIG. 1 shows an illustration of an environment including a system which uses server overload protection in accordance with an embodiment of the invention. As shown in FIG. 1, a server 100 accepts requests from multiple clients 102, 104, 106. In this instance server 100 includes a plurality of servlets 108, 110, 112, each with their associated workload manager. The server includes a server state monitor 116 or similar mechanism for determining current server load. The server also includes a priority queue 118 for accepting requests prior to communicating the requests to the servlets, and a queuing logic 124 that accepts status information from the server state monitor and controls entry into the priority queue. In operation, as clients make requests 126, 130, 138, the queuing logic will only queue those requests that it deems acceptable given the current system state. Servlets configured with a higher priority have their requests queued at a higher priority. Servlets configured with a lower priority may find incoming requests are rejected 138, in some instances with a customer message or action.

Example Implementation

The following sections describe an example implementation including the overload actions taken on exceeding the execute queue length, transaction count, HTTP session count and on encountering an OOME. In accordance with an embodiment, JRockit specific API's are used to calculate memory usage after every GC interval and provide notification if the average free memory drops below the configured threshold. This also ensures faster failover of RMI clients in an overloaded cluster by directing them to a member that is still available to take requests.

DEFINITION OF TERMS, ACRONYMS, AND ABBREVIATIONS

Overload—A server condition in which accepting more requests would result in deterioration of server performance and stability. The server has exceeded it's resource capacity, such as available memory.

OOM—java.lang.OutOfMemoryError thrown by the VM

FD—File descriptor

OOM Protection

This feature enables the server to exit on encountering OOM error. On JRockit VM's, proprietary API's are used to calculate memory usage after every full GC and generate events when the average free memory goes below a threshold.

There are two parts to OOM protection—exit on OOME and mbean notification's when the average free memory is below a threshold. The server will catch OOM errors thrown during the execution of a request and exit immediately if configured to do so. This is based on the assumption that application's do not catch OOM error's themselves. This feature is useful if the server is backed by the NodeManager or by a HA solution. The server will exit with a well defined exit code distinguishable from normal VM termination.

On JRockit, it's management API is used to calculate memory usage after every GC interval. A low memory event will be sent to the registered listeners if the average free memory goes below a configured threshold. The server is treated as overloaded and the configured overload action is taken. Note that the design of the notification mechanism isn't JRockit specific, but will work on other VM's that include this functionality.

Hysteresis can be built into the low memory notification. There is an upper bound on the used memory after which low memory notification is sent out. There is a lower bound after which the low memory notification is withdrawn.

The console can have an overload protection section that will contain the following options:

Exit server process on encountering OutOfMemoryError

Average free memory threshold & number of memory samples used to calculate the free memory.

The server can catch OOME generated during execution of a request and exit with a well defined error code. It is assumed that applications will not handle OOME themselves. The system will also handle OOME similarly in internal subsystem's wherever possible.

Administrators can configure a free memory threshold as a percentage of total memory. The server is considered overloaded after this threshold and the configured overload action is taken. The parameters used to determine low memory condition already exist in the ServerMBean (e.g. LowMemorySampleSize). The system goes one step further and executes the overload action on Jrockit and comparable VM products.

Java Programming Interfaces

Subsystems can register for memory notifications using the standard MBean notification scheme. The following is an example:

1. Adding a MemoryListener to the JVMRuntime
   JVMRuntimeMBean
      jvmRuntime=serverRuntime.getJVMRuntime( );
      mbeanServer.addNotificationListener(jvmRuntime.getObjectName( ),
   myMemoryListener,
   myMemoryFilter, null);

2. Implementation of MyMemoryFilter

```
import weblogic.management.runtime.MemoryNotification;
public class MyMemoryFilter implements
javax.management.NotificationFilter {
    public boolean isNotificationEnabled( Notification n ) {
        if (n instanceof MemoryNotification) {
            long freeMemory =
( (MemoryNotification)n).getFreeMemory( );
            long totalMemory =
( (MemoryNotification)n).getTotalMemory( );
            if (freeMemory < (0.2 * totalMemory)) {
                return true;
            }
        }
        return false;
    }
} // end of MyMemoryFilter
```

The weblogic.management.runtime.MemoryNotification can have two methods, getFreeMemory( ) and getTotalMemory( ). The getFreeMemory( ) returns the average free memory over "ServerMBean.LowMemorySampleSize" samples.

Periodic notifications about the average free memory is sent to listeners who have specified notification filters. If a notification filter is not specified, a notification is sent only when the free memory is below the globally configured memory threshold.

Execute Queue Length Protection

This feature allows administrator's to limit the number of outstanding requests in the execute queue. Basically, administrators can define a global queue threshold after which requests will be throttled. The self-tuning dispatch model also allows an enqueued request to be associated with an OverloadManager. The OverloadManager decides the maximum pending requests for that request class. OverloadManager's override the global queue threshold.

Non-transactional RMI requests with a low fair share will be rejected immediately in an overloaded server. This applies to one-way, synchronous or asynchronous RMI. If the overload condition continues to persist, higher priority requests will start getting rejected. There are some exceptions to this rule:

Requests destined for subsystems like JMS and transactions are allowed in since they perform their own overload management.

Admin requests are allowed.

webapp requests apart from the internal management one's like the console will be rejected immediately.

Faster RMI Client Failover

A clusterable RMI client is given a special ref if some or all cluster nodes are overloaded. The special ref points to a cluster node that is not overloaded and is still available to take application requests. This will prevent clients from trying multiple cluster node's and failing.

This feature enables RMI client's to quickly identify healthy nodes in an overloaded cluster without having to try every entry in the replica list. If administrators start new cluster nodes to help reduce the overload, it will direct clients to the newly started nodes.

Each server's availability information is transmitted in the cluster heartbeats. The availability information will tell if the server is running, overloaded or suspended. A server is considered as overloaded if it either exceed's the execute queue threshold or running low on memory. The availability information is transmitted back to the clients and used as follows:

All servers in a cluster are healthy. The replica list sent back to the client will have all the server entries. The client is free to choose any server based on it's load balancing policy.

One or more servers in a cluster are overloaded. As a part of the piggyback response, the system will send a special ref to the client that points to a server that is not overloaded. The client will try this special ref for it's next request since it has a better change of success. After execution, the server can send back another special ref or retain the same one for the next client execution. This will continue till the overload condition goes away. The server rotates the special ref if there are a multiple of them.

If a new cluster node is started to reduce the overload condition, the special ref will point to the newly started node. To avoid flooding at the new node, the special ref can be withdrawn after a few requests. If all the cluster nodes are overloaded, the client is asked not to try till a certain period of time. The waiting time is determined by the server's throughput, the number of pending requests in the execute queue etc.

Active Transactions Limit

This feature allows an administrator to limit the number of active transactions in the server. Once the maximum limit is reached, the server will refuse to participate in new transactions. Note that RMI calls that are associated with an existing transaction will be allowed in. Only RMI calls that try to start a new transaction will be refused.

The console can have an option to specify the transaction limit. The transaction subsystem will throw a javax.transaction.SystemException when the transaction limit is exceeded.

Active HTTP Sessions Limit

This feature allows an administrator to limit the number of active HTTP sessions in the server. Limiting the number of new sessions prevent's OOME.

The system will refuse requests that create new HTTP sessions if the maximum session limit is reached. In a cluster, the plugin will redirect the request to another cluster node. In a non-clustered scenario, the server can redirect requests to an alternate server.

The maximum number of primary HTTP sessions allowed in the server can be set in the console. The session limit is global across all applications.

The servlet container will execute one of the following actions if the max-sessions limit is reached:

If the server is in a cluster, a 503 response is sent back and the plugin will failover the request.

If the server is not in a cluster but an alternate server is specified, the servlet container will redirect the request to the alternate server.

If an overload-error-page is specified in the webapp descriptor, the server will use it to send the overload response back to the client.

If an overload redirection url is specified in the console, it will be used to send the overload response.

Deadlock Detection

On JRockit, the system can determine if there is a thread deadlock and exit if desired. This feature is possible only on VM's that have the ability to detect thread deadlocks.

The server will check for stuck threads periodically. If more than one thread is stuck, the system can use the JRockit management API to check if the threads are involved in a deadlock. The server can be configured to exit in this condition. This is useful if the server is backed by the NodeManager or a HA solution like Veritas. The HA backend will restart the server. This provides automatic failure recovery. Note that the system will only detect deadlocks within the same process. Inter process deadlocks is out of the scope. The above actions are also executed if all the threads in a server are stuck and the self-tuning thread model cannot add more threads.

The console can have an option to exit the server process on detecting a thread deadlock. The server will regularly monitor the health of its threads and determine if any of them are stuck. The stuck time interval is already configurable through the console. If more than one thread is stuck, we will use the JRockit management API to check if the stuck threads are involved in a deadlock. The server will save a thread dump in the logs before killing itself.

Per-Channel FD Reservation

Administrators can make file descriptor reservations per network channel. This will enable administrators to access the server even during DOS attacks. This will guarantee that admin users will always gain access to the server even if it is heavily loaded. The server will be administrative even during DOS attacks.

It is possible to specify the number of FD's reserved per network channel for admin users. The server will ensure that at least the reserved number of FD's are assigned to admin users at all times.

Well-Defined Exit Codes

The server uses well defined exit codes while terminating itself in certain overload conditions. The exit codes can be used by shell scripts or HA agents to decide whether a server restart is necessary.

The exit codes shown in Table 1 are defined for server terminations.

TABLE 1

| Condition | Exit code | Recommended action for HA agents or scripts |
| --- | --- | --- |
| Normal termination of the process due to shutdown command | 0 | None |
| Abnormal shutdown due to time out | −1 | None |
| Server started with bad or invalid configuration | −2 | None |
| Server needs restart for configuration to take effect | −3 | Start server again |
| OOME | −4 | Start server again |
| Deadlock found | −5 | Start server again. The system will save a thread dump to the log file before termination. |

Overloaded Server State

A state "OVERLOADED" can be added as a new server state. This state will be returned by the ServerRuntimeMBean.getState( ) and ServerLifeCycleRuntimeMBean.getState( ) if the server is RUNNING but is overloaded. The overload condition can happen either due to the execute queue length reaching it's threshold or due to low memory. The server state will change back into RUNNING after the overload condition goes away. The state transitions are as follows:

1. SHUTDOWN- ->STANDBY- ->RUNNING- ->OVERLOADED- ->RUNNING- ->SHUTDOWN
2. SHUTDOWN- ->STANDBY- ->RUNNING- ->OVERLOADED- ->FAILED- ->SHUTDOWN

Operations available in the RUNNING state are also supported in the OVERLOADED state. So, a server can be suspended or shutdown from the OVERLOADED state. Having a separate OVERLOADED state ensures that overload conditions are prominently displayed in the management console and through the various MBean utilities. It is also convenient for subsystems to add notification listener's to the ServerLifeCycleRuntime and get OVERLOADED notification as a part of the regular state change notification scheme.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. Particularly, while various embodiments are described as using or working with JRockit, it will be evident that other VM products can be used. It is intended that the scope of the invention be defined by the following claims and their equivalence.

What is claimed is:

1. A system for providing an application server with overload protection, comprising:

a server including one or more processors, said server configured to receive requests from clients, and including a plurality of workload managers operating thereon, wherein each workload manager is assigned a priority and receives requests according to that priority, and wherein a global overload threshold setting indicates a minimum priority for which the plurality of workload managers accept requests during a possible overload condition;

a priority queue operating at the server configured to store the requests until the requests are processed by the plurality of workload managers;

a plurality of listeners operating at the server configured to receive state information of the server indicating a possible overload condition of the server;

a queuing logic operating at the server that determines the priority of requests being received as determined by the priority of the workload manager each request is directed to, wherein the queuing logic receives the state information of the server from the listeners indicating the possible overload condition, and based on that indication, rejects requests to those workload managers assigned a priority below the global overload threshold, and generates a customizable rejection message which is returned to the calling client of the rejected workload manager.

2. The system of claim 1 wherein each workload manager is associated with a servlet, and wherein the requests are directed to servlets operating on said server and reached by said workload managers.

3. The system of claim 1 wherein the workload managers are prioritized by allocating a portion of available thread time for their use.

4. The system of claim 3 wherein the portion of available thread time is specified as a relative share value of allowed thread time for one workload manager compared to another.

5. The system of claim 1 wherein the workload managers can be manually prioritized by a system administrator.

6. The system of claim 5 wherein the system includes a console application for use by said system administrator in prioritizing said workload managers.

7. The system of claim 1 wherein the requests thus prioritized according to destination workload manager are placed in a queue according to their priority.

8. The system of claim 7 wherein requests that are not placed in the queue are rejected.

9. The system of claim 1 wherein the system receives state information about the current state of the server which it uses to determine a possible overload condition.

10. The system of claim 1 wherein requests are given a virtual time stamp and queued accordingly, according to priority.

11. A method for providing an application server with overload protection, comprising the steps of:
    receiving at a server requests from clients, said server having a plurality of workload managers operating thereon,
        wherein each workload manager is assigned a priority and receives requests according to that priority, and
        wherein a global overload threshold setting indicates a minimum priority for which the plurality of workload managers accept requests during a possible overload condition;
    storing the requests at a priority queue operating at the server until the requests are processed by the plurality of workload managers;
    receiving state information of the server from a plurality of listeners indicating a possible overload condition of the server;
    determining the priority of requests being received as determined by the priority of the workload manager each request is directed to by a queuing logic,
        wherein the queuing logic receives the state information of the server from the listeners indicating the possible overload condition, and based on that indication rejects
            requests to those workload managers assigned a priority below the global overload threshold, and
            generates a customizable rejection message which is returned to the calling client of the rejected workload manager.

12. The method of claim 11 wherein each workload manager is associated with a servlet, and wherein the requests are directed to servlets operating on said server and reached by said workload managers.

13. The method of claim 11 wherein the workload managers are prioritized by allocating a portion of available thread time for their use.

14. The method of claim 13 wherein the portion of available thread time is specified as a relative share value of allowed thread time for one workload manager compared to another.

15. The method of claim 11 wherein the workload managers can be manually prioritized by a system administrator.

16. The method of claim 15 wherein the system includes a console application for use by said system administrator in prioritizing said workload managers.

17. The method of claim 11 wherein the requests thus prioritized according to destination workload manager are placed in a queue according to their priority.

18. The method of claim 17 wherein requests that are not placed in the queue are rejected.

19. The method of claim 11 wherein the system receives state information about the current state of the server which it uses to determine a possible overload condition.

20. The method of claim 11 wherein requests are given a virtual time stamp and queued accordingly, according to priority.

21. A computer readable storage medium storing one or more sequences of instructions for performing overload protection in an application server environment, which instructions, when executed by one or more processors, cause the one or more processors to carry out the steps of:
    receiving at a server requests from clients, said server having a plurality of workload managers operating thereon,
        wherein each workload manager is assigned a priority and receives requests according to that priority, and
        wherein a global overload threshold setting indicates a minimum priority for which the plurality of workload managers accept requests during a possible overload condition;
    storing the requests at a priority queue operating at the server until the requests are processed by the plurality of workload managers;
    receiving state information of the server from a plurality of listeners indicating a possible overload condition of the server;
    determining the priority of requests being received as determined by the priority of the workload manager each request is directed to by a queuing logic,
        wherein the queuing logic receives the state information of the server from the listeners indicating the possible overload condition, and based on that indication rejects
            requests to those workload managers assigned a priority below the global overload threshold, and
            generates a customizable rejection message which is returned to the calling client of the rejected workload manager.

* * * * *

UNITED STATES PATENT AND TRADEMARK OFFICE
CERTIFICATE OF CORRECTION

PATENT NO. : 7,752,629 B2
APPLICATION NO. : 11/132782
DATED : July 6, 2010
INVENTOR(S) : Naresh Revanuru et al.

Page 1 of 1

It is certified that error appears in the above-identified patent and that said Letters Patent is hereby corrected as shown below:

In column 2, line 26, delete "over load" and insert -- overload --, therefor.

In column 2, line 36, delete "Jrockit" and insert -- JRockit --, therefor.

Signed and Sealed this
Nineteenth Day of April, 2011

David J. Kappos
*Director of the United States Patent and Trademark Office*